US008307621B2

(12) United States Patent
Weber et al.

(10) Patent No.: US 8,307,621 B2
(45) Date of Patent: Nov. 13, 2012

(54) DEVICE AND METHOD FOR THE PROVISION OF CUT ROVINGS AND MACHINE FOR THE REINFORCEMENT OF A SEMI-FINISHED TEXTILE PRODUCT

(75) Inventors: Hans-Jürgen Weber, Verden (DE); Gregor Christian Endres, Pfaffenhofen (DE)

(73) Assignee: Airbus Operations GmbH, Hamburg (DE)

( * ) Notice: Subject to any disclaimer, the term of this patent is extended or adjusted under 35 U.S.C. 154(b) by 231 days.

(21) Appl. No.: 12/669,960

(22) PCT Filed: Jul. 18, 2008

(86) PCT No.: PCT/EP2008/059455
§ 371 (c)(1),
(2), (4) Date: Jun. 3, 2010

(87) PCT Pub. No.: WO2009/013241
PCT Pub. Date: Jan. 29, 2009

(65) Prior Publication Data
US 2010/0236212 A1 Sep. 23, 2010

Related U.S. Application Data

(60) Provisional application No. 60/950,967, filed on Jul. 20, 2007.

(30) Foreign Application Priority Data

Jul. 20, 2007 (DE) .......................... 10 2007 033 869

(51) Int. Cl.
*D01G 1/10* (2006.01)

(52) U.S. Cl. .................................................. 57/2; 19/6
(58) Field of Classification Search .................. 57/2, 6; 19/0.58, 0.6, 65 A, 65 T; 112/285, 286, 289
See application file for complete search history.

(56) References Cited

U.S. PATENT DOCUMENTS

| 5,027,731 A * | 7/1991 | Sato et al. ...................... 112/286 |
| 5,289,791 A * | 3/1994 | Sanders et al. ............ 112/475.01 |
| 8,020,502 B2 * | 9/2011 | Hanada .......................... 112/285 |
| 2002/0069802 A1 * | 6/2002 | Hintzen et al. ................ 112/285 |
| 2005/0263054 A1 | 12/2005 | Kato |

FOREIGN PATENT DOCUMENTS

| DE | 10 2005 024408 A1 | 11/2006 |
| WO | WO 92/00845 A | 1/1992 |

OTHER PUBLICATIONS

PCT International Search Report and Written Opinion, PCT/EP2008/059455, Oct. 24, 2008, 9 pages.

* cited by examiner

*Primary Examiner* — Shaun R Hurley
(74) *Attorney, Agent, or Firm* — Fenwick & West LLP (57) ABSTRACT

The present invention relates to a device and a method for providing cut-to-length rovings having a defined length from an endless roving, in particular in the aviation and aerospace sector, and also to a machine with a device of this type. The device comprises a loop shape setting arrangement, a loop bracing arrangement and a cutting arrangement. An endless roving can be braced by means of the loop bracing arrangement onto the loop shape setting arrangement, thus forming a loop which can be cut to length by means of the cutting arrangement in order to produce the cut-to-length roving.

19 Claims, 13 Drawing Sheets

DEVICE AND METHOD FOR THE PROVISION OF CUT ROVINGS AND MACHINE FOR THE REINFORCEMENT OF A SEMI-FINISHED TEXTILE PRODUCT

CROSS-REFERENCE TO RELATED APPLICATIONS

This application claims the benefit of U.S. Provisional Application No. 60/950,967, filed Jul. 20, 2007 and German patent application No. 10 2007 033 869.6, filed Jul. 20, 2007, the entire disclosures of which are herein incorporated by reference.

FIELD OF THE INVENTION

The present invention relates to a device and a method for providing cut-to-length rovings having a defined length from an endless roving, in particular in the aviation and aerospace sector, and also to a machine for reinforcing a semi-finished textile product, in particular in the thickness direction thereof.

BACKGROUND OF THE INVENTION

Fibre composite plastic (FCP) laminates differ from monolithic metals in particular in that they have a layered structure. Sudden loading, for example, can therefore lead to two mutually bordering layers becoming detached from each other (also referred to as "delamination"). In order to avoid such failure behaviour, there are various approaches for reinforcing FCP laminates by means of fibres running perpendicularly to the layers (referred to hereinafter as the third spatial direction).

A first approach to be mentioned in this connection involves the sewing methods. A distinction must be drawn in this regard between two-sided and one-sided sewing methods:

Two-sided sewing methods are distinguished by an upper and a lower thread. The needle pierces, together with the upper thread, through the FCP laminate. On the underside of the FCP laminate, the loop of the upper thread is fixed by means of the lower thread. The needle is retracted and plunges in again at a defined distance from the preceding stitch. Through repetition, this produces a continuous seam.

One-sided sewing methods are distinguished in that they do not have a lower thread. These methods include for example tufting or blind-stitching.

Sewing methods have been found to have the drawback that the needles are comparatively thick, causing marked fibre displacements in the FCP laminates. The quantity of fibres that can be introduced by means of sewing methods is also low compared to the cavities which are formed in the FCP laminates by the insertion of the needle.

A second known approach for reinforcing FCP laminates in the third spatial direction utilises semi-finished products which are already provided with a matrix and cured, in particular pins. These pins are manufactured for example by pultrusion, inserted into the FCP laminates in the third spatial direction by piercing them and fixed by means of the matrix in the FCP laminates.

In the method according to the second approach, the introduction of the pins has proven to be very complex and thus cost-intensive.

The applicant therefore developed a better method for reinforcing semi-finished textile products in the third spatial direction that is described in DE 102005024408 A1 and will be briefly outlined hereinafter with reference to FIG. 1 to 4.

Figure 1:
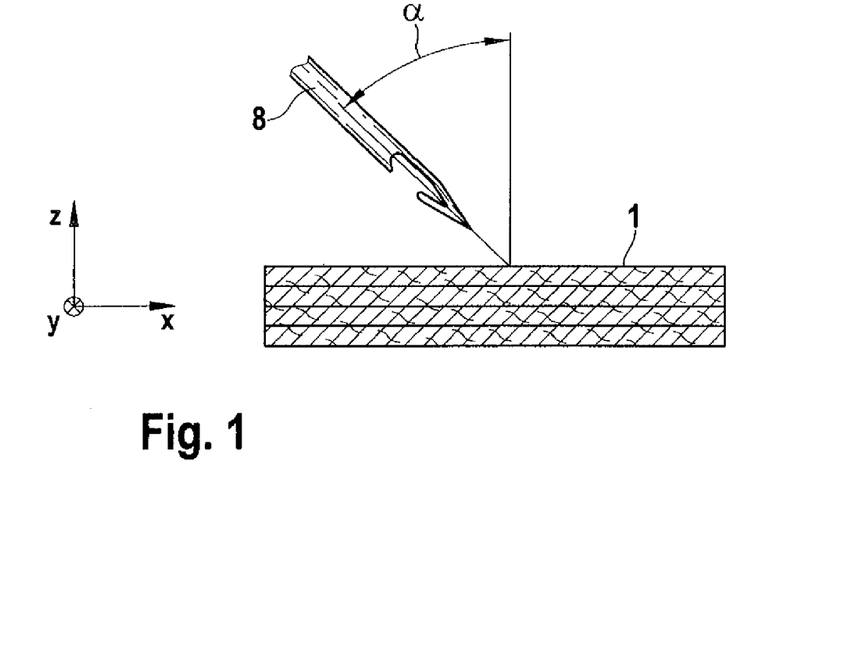
FIG. 1 shows a method state according to a known method.

FIG. 1 shows a hook needle 8 prior to insertion into a semi-finished textile product 1. The semi-finished textile product is for example a fibre ply in which the fibres extend, as shown, in the x-y plane. As shown in FIG. 1, the needle 8 is at an angle α of <90 degrees to the third spatial direction z. The needle therefore has a component in the third spatial direction z.

Figure 2:
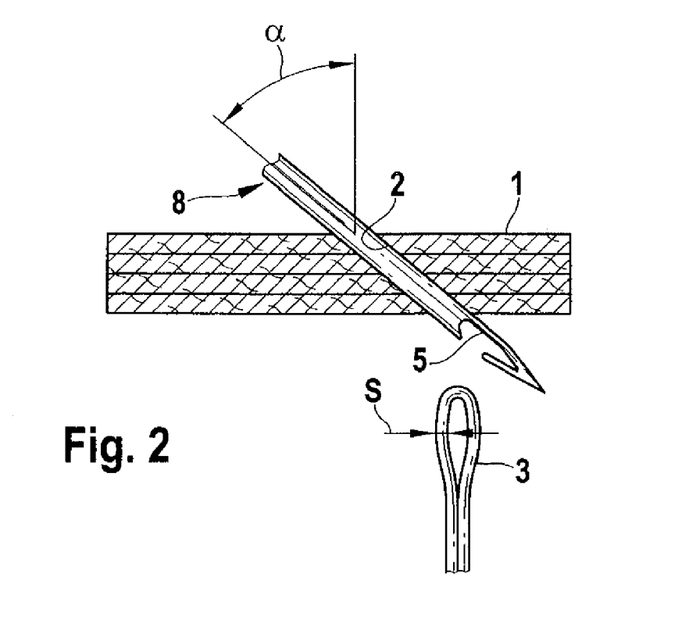
FIG. 2 shows a further method step according to the known method.

FIG. 2 shows a stage of the manufacturing method at which the needle 8 has just pierced the semi-finished textile product 1 with its tip which has an eye 5. Located below the semi-finished textile product 1, in the region of the point at which the needle 8 emerges, is a roving 3 (for example a 24 K roving) which has been shaped, in close proximity to the underside of the semi-finished textile product 1, to form a loop. The roving 3 is picked up by the needle 8 by means of the eye 5. The roving 3 has a single thickness S, so that the roving from FIG. 2, which is folded to form the loop, has a roughly double thickness 2S.

Figure 3:
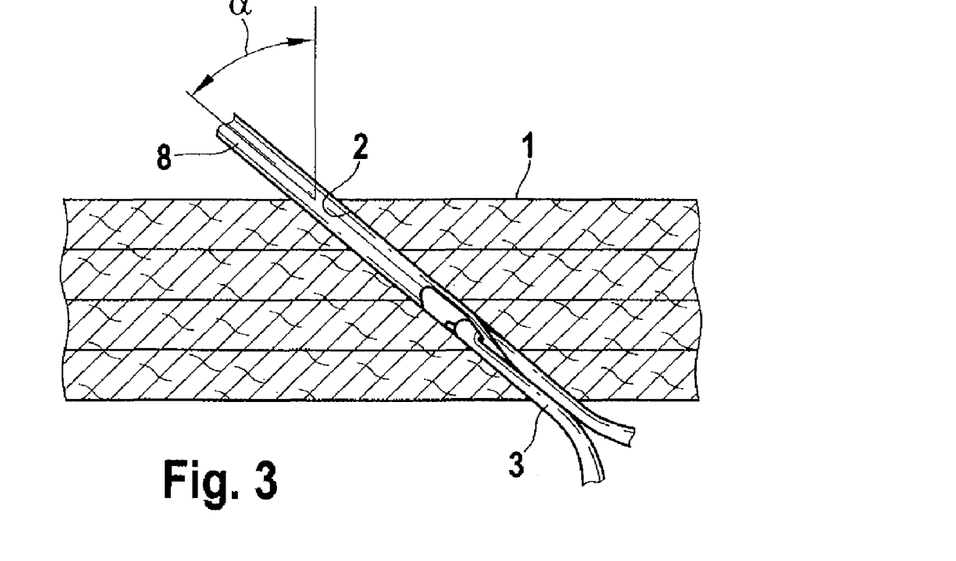
FIG. 3 shows another method step according to the known method.

In FIG. 3 the needle 8 is already being retracted again from the semi-finished textile product 1 and, as a consequence of this retraction, the roving 3, which is picked up by the needle 8, is drawn at the underside of the semi-finished textile product 1 into the through-hole 2 formed by the needle 8 during insertion, thus compressing the roving 3.

Figure 4:
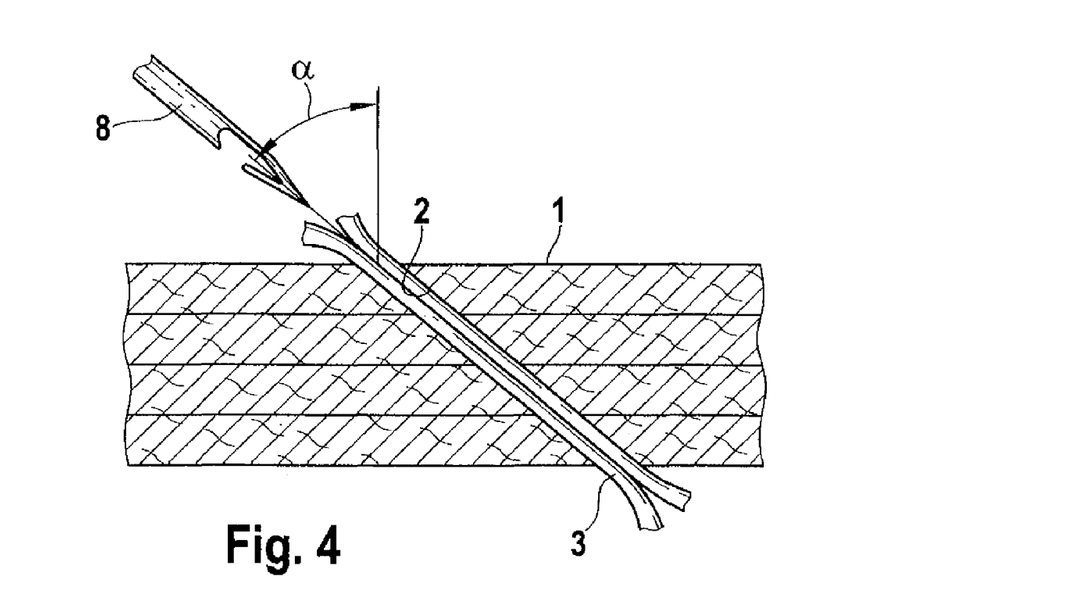
FIG. 4 shows another method step according to the known methods.

In FIG. 4 the entire roving 3 has been drawn into the semi-finished textile product 1, the needle 8 already having been uncoupled from the roving 3. The roving 3 can now for example be cut off flush on both sides of the semi-finished textile product 1 in order subsequently to infiltrate the through-hole 2 and the roving 3 arranged therein with a resin.

Roving material is usually provided as an endless roving which is wound for example onto a bobbin. In order now to obtain the cut-to-length roving 3 which is shown in FIG. 3 and has a length adapted to the thickness (in the z direction) of the semi-finished textile product 1, the cut-to-length roving must be separated off from the endless roving and must be provided to the eye 5 of the needle 8 below the semi-finished textile product 1.

Manually providing the roving 3 in FIG. 2 is impractical for reasons of cost. There is therefore need for a device which provides the roving 3 in an automated manner. No such device is at present commercially available.

SUMMARY OF THE INVENTION

One of the objects of the present invention is therefore to provide a device and a method for providing cut-to-length rovings having a defined length from an endless roving, in particular in the aviation and aerospace sector. A further object of the present invention is to provide a machine which enables a semi-finished textile product to be reinforced, in particular in the thickness direction thereof.

According to the invention, this object is achieved by a device, method, or machine for providing cut-to-length rovings having a defined length from an endless roving. In one embodiment, the device comprises a loop shape setting arrangement which sets a shape of a loop to be formed; a loop bracing arrangement which can rotate about the loop shape setting arrangement and by means of which the endless roving can be braced onto the loop shape setting arrangement to form the loop; and a cutting arrangement by means of which the loop which is formed can be cut to length from the endless roving in order to produce the cut-to-length roving. In one embodiment, the method comprises setting a shape of a loop to be formed by means of a loop shape setting arrangement; bracing the endless roving onto the loop shape setting arrangement by means of a loop bracing arrangement which can rotate about the loop shape setting arrangement; and cutting to length the loop which is formed from the endless roving in order to produce the cut-to-length roving by means of a cutting arrangement. In one embodiment, the machine comprises the device and a needle which comprises a tip which is provided with an eye for taking up the cut-to-length roving. The machine also comprises a take-up region into which the semi-finished textile product can be inserted in a planar manner between the needle and the device. In a first operation of the machine, the needle penetrates the semi-finished textile product and forms a through-hole therein, in a second operation of the machine, the eye centrally takes up the cut-to-length roving from the removal region of the loop shape setting arrangement and in a third operation, draws the doubled-up roving into the through-hole.

Accordingly, a device is provided comprising a loop shape setting arrangement, a loop bracing arrangement and a cutting arrangement. The loop bracing arrangement is provided so as to be rotatable about the loop shape setting arrangement, wherein the endless roving can be braced onto the loop shape setting arrangement to form the loop. By means of the cutting arrangement, the loop can be cut to length from the endless roving in order to produce the cut-to-length roving.

The method according to the invention provides the following steps: Firstly, a shape of a loop to be formed is set by means of a loop shape setting arrangement. In a further step, the endless roving is braced onto the loop shape setting arrangement by means of a loop bracing arrangement which can rotate about the loop shape setting arrangement. Subsequently, the loop which is formed is cut to length from the endless roving in order in this way to produce the cut-to-length roving. The cutting-to-length is carried out by means of a cutting arrangement.

The machine according to the invention comprises the device according to the invention, a needle and a take-up region. The needle comprises a tip which is provided with an eye for taking up the cut-to-length roving. A semi-finished textile product can be inserted into the take-up region in a planar manner between the needle and the device. In a first operation of the machine, the needle penetrates the semi-finished textile product and thus forms a through-hole therein. In a second operation of the machine, the eye picks up roughly at the centre the cut-to-length roving from the removal region of the loop shape setting arrangement and, in a third operation, the needle draws the doubled-up roving into the through-hole.

The idea underlying the present invention is that a cut-to-length roving having a defined length can easily be produced in that the endless roving is wound around a body and afterwards is cut off. A device allowing this to be brought about has a very simple construction.

The fact that the roving is provided as a loop means that it can be picked up very easily in such a way that it assumes the doubled-up form illustrated in relation to FIG. 2.

The sub-claims contain advantageous embodiments of and improvements to the invention.

The term "a loop bracing arrangement which can rotate about the loop shape setting arrangement" is intended to include kinematically equivalent embodiments in which the endless roving can be braced onto the setting arrangement. Accordingly, the loop bracing arrangement can therefore be rotated about the loop shape setting arrangement or else the loop shape setting arrangement can be rotated in a stationary loop bracing arrangement.

In the context of the present invention, the term a "semi-finished textile product" is intended to include not only any fibre ply, fibre fabric and fibre felt, but also foams, for example PMI rigid foam or PVC foam or PU foam.

The term "rovings" refers to bundles of fibres, in particular fibres made of glass, aramid or carbon. However, individual fibres and yarns may also be included under the term "roving" in the present document. The rovings can also be pre-impregnated with a resin matrix.

The term "loop" refers in the present document to a closed geometry of the endless roving. An example of a closed geometry of this type may be seen from the plan view of FIG. 9F. According to the present definition, the loop begins at one end of the endless roving and ends in the region of the endless roving that is arranged, after bracing onto the loop shape setting arrangement, parallel to and bordering the end of the endless roving (This is the case only in FIG. 9F, but not in FIG. 9A to 9E.). A closed geometry allows an immediate transition between successive steps for manufacturing cut-to-length rovings.

According to a preferred development of the device according to the invention, the loop shape setting arrangement has a removal-side holding means and a supply-side holding means which is spaced apart therefrom, which holding means form a frame onto which the endless roving can be braced to form the loop.

If the endless roving is wound once around the frame and is then cut off, this produces a cut-to-length roving having a defined length. An advantage of this is the fact that the cut-to-length roving can be produced by means of a rotatory movement which is kinematically simple to perform.

In principle, the frame can be polygonal, in particular triangular or quadrangular, or elliptical or round in its shape, although a rectangular frame is preferred. In this case, the supply-side and removal-side holding means preferably define the corner points of the frame.

According to a further preferred embodiment of the device according to the invention, the removal-side and the supply-side holding means are formed as grooves.

Should the removal-side or supply-side holding means be formed from a plurality of components, each of these components can for example have a suitable groove. Grooves are well suited for preventing the loop from slipping in a direction transverse to the direction in which the groove extends, wherein it is easy to wind round the grooves simultaneously by means of the endless roving, i.e. the grooves are accessible to the loop bracing arrangement for inserting the roving into the groove.

In a further preferred development of the device according to the invention, the loop shape setting arrangement has a removal region for taking up the cut-to-length roving by means of a needle.

At this point, reference should expressly be made to the fact that the device can be used not only in conjunction with a needle, but that other means can also be provided for removing the thread from the removal region. However, the removal of the cut-to-length roving by means of a needle is made especially simple, in particular when the needle is in the form of a hook needle, i.e. has an appropriate eye for picking up the cut-to-length roving. In particular, the removal region and the removal-side holding means are produced using, at least in part, the same means, i.e. the grooves in the removal region are for example the same as those in the removal-side holding means.

According to a further preferred development of the device according to the invention, the removal region is formed as two grooves for guiding the loop via a recess arranged between the two grooves.

In this case, the needle engages, between the two grooves, with the recess in which the roving is readily accessible in its radial direction and can thus easily be gripped by the hook needle.

In a further preferred embodiment of the device according to the invention, the cutting arrangement is arranged opposite the removal region based on a centre point of an axis of symmetry of the frame.

This offers the advantage that the roving can for example be centrally gripped by the needle in the removal region, so that the roving is doubled-up over its entire length.

In a further preferred development of the device according to the invention, the distance between the removal-side and the supply-side holding means is adjustable, in particular by means of a spindle drive.

By varying the distance, it is readily possible to simply set the size of the loop and thus the length of the cut-to-length roving. Thus, it is for example possible to simply adapt the length of the roving to variations in thickness of the semi-finished textile product, caused for example by ramps.

In a further preferred development of the device according to the invention, the removal-side holding means with the removal region is provided so as to be stationary and the supply-side holding means with the cutting arrangement is provided so as to be linearly adjustable with respect to the removal-side holding means with the removal region.

This measure allows the size of the loop and thus the length of the cut-to-length roving to be varied, without a position of the needle with respect to the device having to be varied, as the position of the removal region remains unchanged.

However, inverse kinematics are equally conceivable, the removal-side holding means with the removal region being provided so as to be linearly adjustable with respect to the supply-side holding means and the supply-side holding means with the cutting arrangement being provided so as to be stationary.

According to a further preferred development of the device according to the invention, the loop shape setting arrangement has a clamping arrangement, in particular a notch or clamping rolls, for clamping an end of the endless roving.

In particular, the clamping device is part of the supply-side holding means.

Preferably, the clamping arrangement is directly adjacent to the cutting arrangement in such a way that, when the endless roving has been wound 1+x times, for example 1 and ⅛ times, around the frame of the loop shape setting arrangement, the region of the endless roving that is associated with the $x^{th}$ time is clamped in the clamping arrangement and the region of the endless roving that is associated with the $1^{st}$ time is cut off therefrom.

A notch is a very simple means for achieving the required clamping action.

In a further preferred development of the device according to the invention, the loop bracing arrangement has a ring which is provided so as to be rotatable about the loop shape setting arrangement, wherein the endless roving can be fed to the loop shape setting arrangement through an opening in the wall of the ring.

Kinematic equivalents are intended to be included in this case too, i.e. provision may equally well be made for the loop shape setting arrangement to rotate about itself and for the loop bracing arrangement, i.e. in particular the ring, to be provided so as to be stationary.

The opening in the wall guides the endless roving around the loop shape setting arrangement, the endless roving gradually slipping through the opening and thus being fed to the loop shape setting arrangement, an end of the endless roving being fastened to the loop shape setting arrangement.

According to a further preferred embodiment of the device according to the invention, the opening lies in the plane of the frame. In particular, the opening lies in the plane of the grooves forming the holding means.

According to a further preferred development of the device according to the invention, the opening is formed as a slot extending in certain portions in the circumferential direction of the ring. This allows the roving to be braced more rapidly onto the frame, as will be commented on in greater detail in connection with the description of the figures.

In a further preferred development of the device according to the invention, a ramp is formed on the outside of the ring and begins, viewed in the longitudinal direction of the ring, upstream of the opening in the ring and ends, at an end face of the ring, downstream of the opening.

The purpose of the ramp is to lift the roving above the end face of the ring at a moment at which the endless roving forms roughly half the loop, i.e. the opening is wound through roughly 180 degrees around the loop shape setting arrangement. This measure allows the roving or the endless roving typically provided on a spindle, which is provided so as to be stationary, to be placed around the loop setting arrangement, in relation to the spindle.

In a further preferred embodiment of the invention in accordance with the device according to the invention, the device has a shaft, on one end of which the loop shape setting arrangement is mounted and at the other end of which a means, in particular a flange, is provided for securing the shaft to a machine associated with the device, a bearing portion of the loop bracing arrangement being provided so as to be supported on the shaft, said bearing portion adjoining the ring in the longitudinal direction.

This configuration allows the ring to be accessed at its one opening from the outside, in particular by the needle, so that the roving can be picked up, whereas the other opening is adjoined by the bearing portion which comprises the bearing means, as a result of which the other opening of the ring is substantially closed. A device developed in this way is easy to assemble.

In a further preferred development of the device according to the invention, the axis of rotation of the ring is substantially perpendicular to the plane of the frame. This is a simple design of the device.

In a further preferred development of the device according to the invention, the loop shape setting arrangement is provided so as to be rotationally fixed and the loop bracing arrangement is provided so as to be able to be driven in rotation.

A development of this type simplifies the construction of a machine in which the device is provided, as in this way the needle does not have to be moved in conjunction with the loop shape setting arrangement, but rather can be provided so as to be stationary.

BRIEF DESCRIPTION OF THE DRAWINGS

The invention will be described hereinafter in greater detail based on exemplary embodiments and with reference to the appended figures, in which.

In the figures, unless otherwise stated, like reference numerals denote identical or functionally identical components.

DETAILED DESCRIPTION OF THE DRAWINGS

The construction of the machine 10 according to the invention or the construction of the device 11 according to the invention will be described hereinafter with reference to FIG. 5 to 8.

Figure 5:
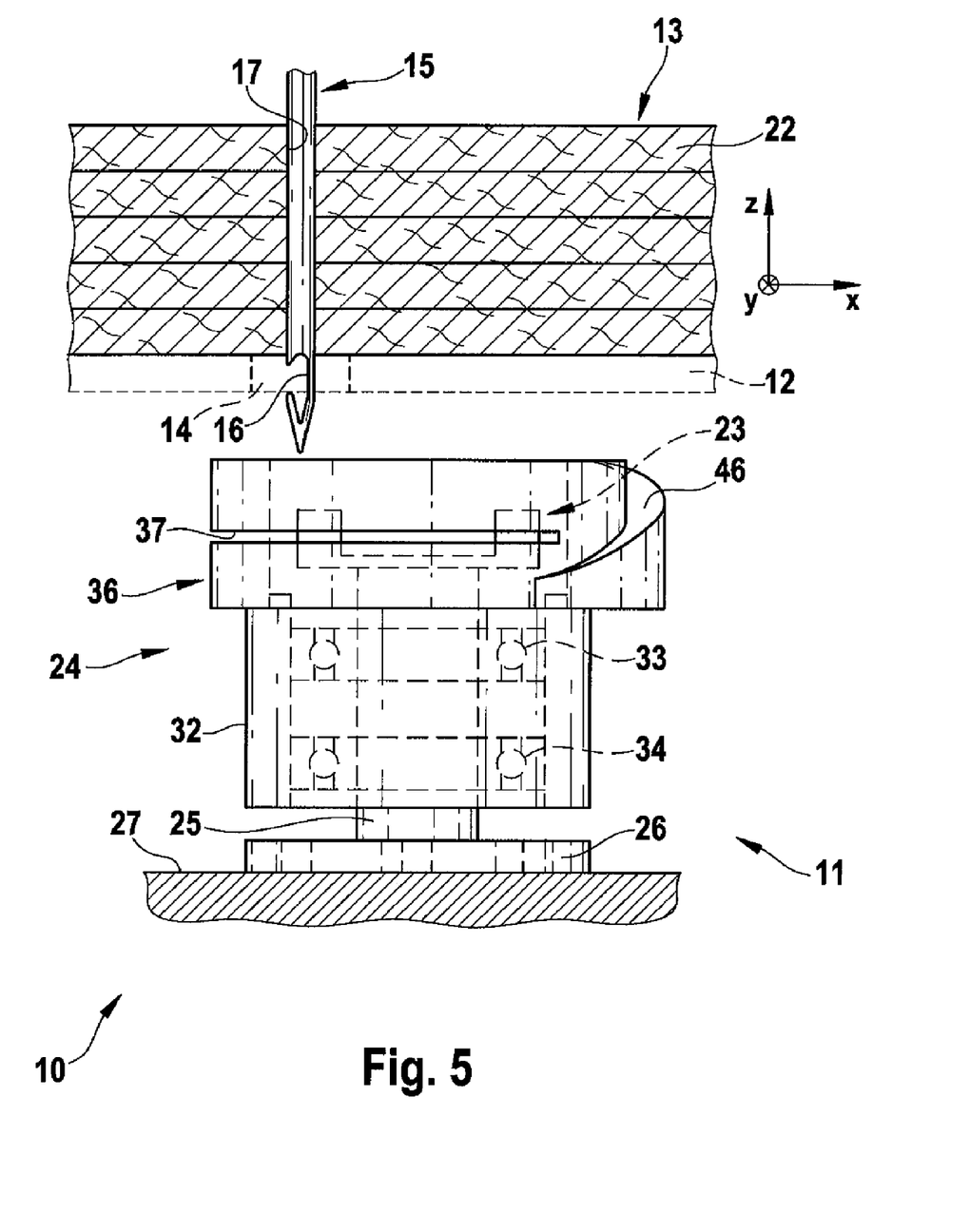
FIG. 5 is a side view of a detail from a machine with a device according to an exemplary embodiment of the present invention.

The machine 10 according to the invention has a take-up region 12 (indicated by broken lines) onto which, in the method state illustrated in the present case, a semi-finished textile product, for example a carbon fibre ply 13, is deposited. The take-up region is for example formed as a plate with a through-region 14 for a hook needle 15.

In the method state illustrated in FIG. 5, the hook needle 15 with an eye 16, which is open on one side, is pushed through the semi-finished product 13. In this case, the hook needle 15 extends through a through-hole 17 in the semi-finished product 13 substantially perpendicularly (i.e. in the third spatial direction z) to the plane of extension x-y of the fibre layers (provided by way of example with reference numeral 22) in the semi-finished product 13.

Furthermore, the machine 10 has a device 11 which is arranged below the semi-finished product 13.

The device 11 has a loop shape setting arrangement (referred to hereinafter as the setting arrangement) 23 which is arranged within a loop bracing arrangement (referred to hereinafter as the bracing arrangement) 24.

The setting arrangement 23 is securely attached to the end of a shaft 25, the end of the shaft 25 that opposes the setting arrangement 23 being provided with a flange 26. The flange 26 is fastened to a stationary point 27 of the machine 10 by means of screws (not shown). The bracing arrangement 24 has a bearing portion 32 with which the bracing arrangement is provided so as to be able to rotate about the shaft by means of bearings 33, 34 on the shaft 25.

The bearing portion 32 is adjoined in the direction of the take-up region 12 of the machine 10 by a ring 36 which is securely connected to the bearing portion 32.

Figure 6:
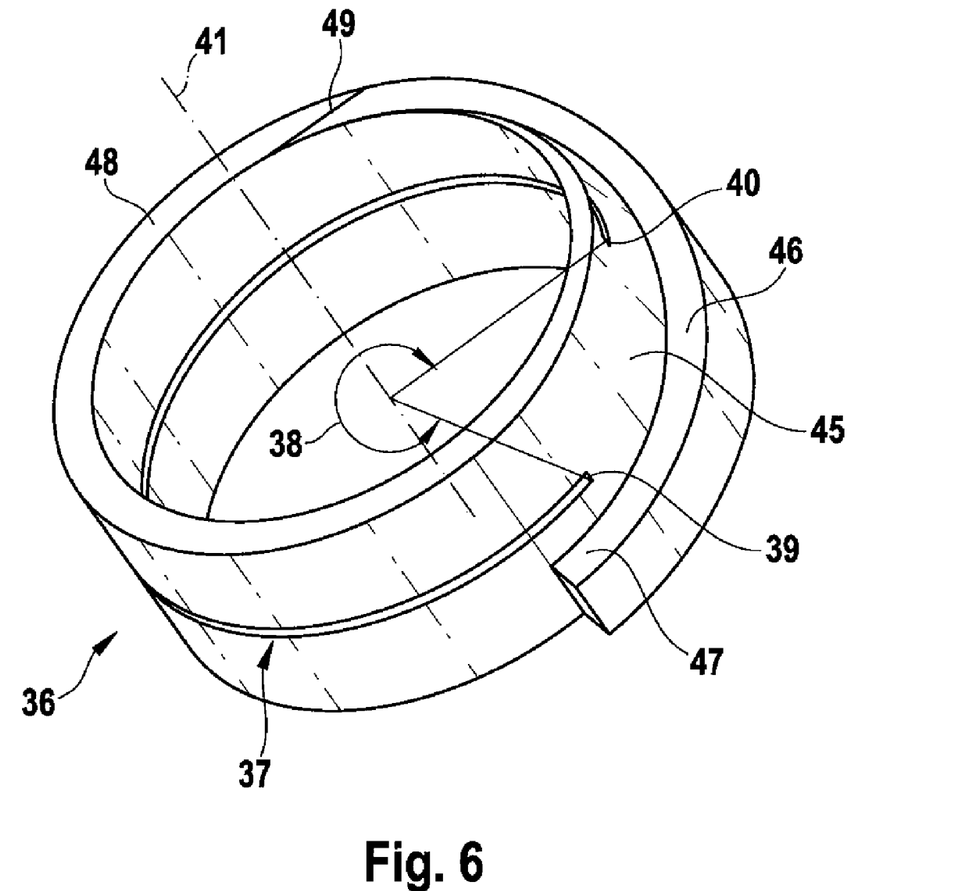
FIG. 6 shows a ring of the device from FIG. 5.

In FIG. 6 the ring 36 is shown in isolation from the device 11.

The ring 36 has, preferably roughly at its centre, a slot 37 via which a roving (not shown in greater detail in this figure) can be fed through to the setting arrangement 23 within the ring 36. The slot 37 extends in the ring 36 in the circumferential direction of the ring 36, but merely over an angle 38 of preferably between 180 and 340 degrees. In this connection, the start of the slot 37 is provided with reference numeral 39 and the end of the slot 37 is provided with reference numeral 40.

The ring 36 has at its outside 45 a ramp 46 which extends, viewed in the longitudinal direction 41, around the ring 36 from a region 47 below the start 39 of the slot 37 and ends, at the end face 48 of the ring, in the region 49. When the device 11 is installed, the end face 48 faces the hook needle 15 or the semi-finished textile product 13.

Figure 7:
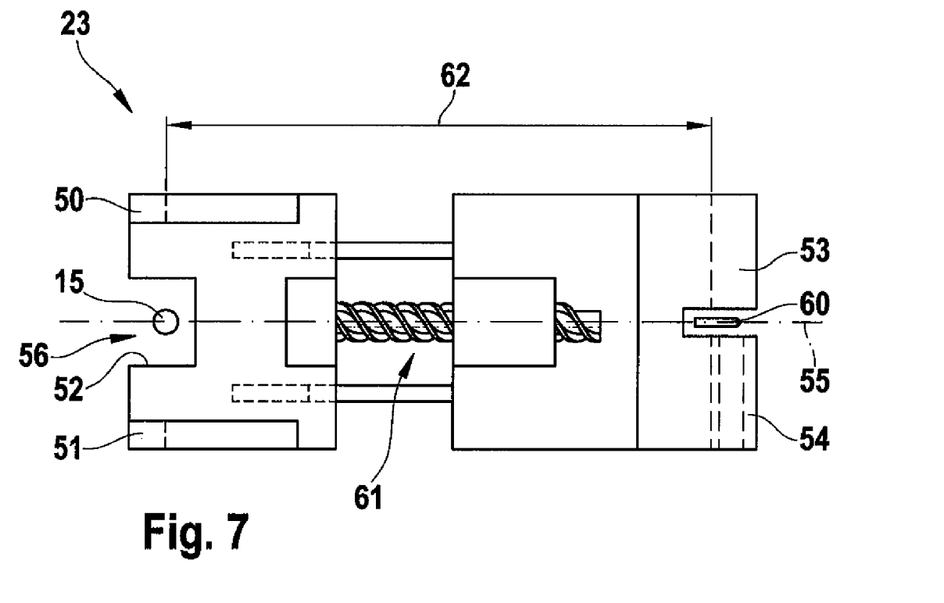
FIG. 7 is a plan view of a loop setting arrangement from FIG. 5.
Figure 8:
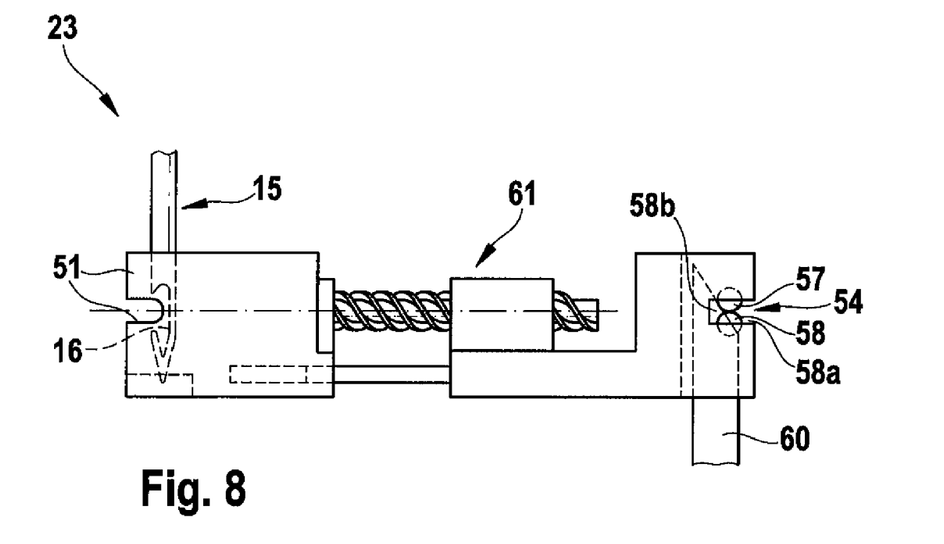
FIG. 8 is a side view of the loop setting arrangement from FIG. 7.

FIGS. 7 and 8 are detailed views of the setting arrangement 23.

The setting arrangement 23 has removal-side holding means 50, 51 which are formed as grooves. Provided between the grooves is a recess 52 which allows the hook needle 15 to take up the roving (not shown) running between the grooves by means of the eye 16. The point at which the hook needle 15, in relation to the setting arrangement 23, removes the roving, in the present case between the two grooves (holding means 50, 51), will be referred to hereinafter as the removal region 56 and corresponds, in the state illustrated in FIGS. 7 and 8, to the position of the eye 16.

The setting arrangement 23 also has supply-side holding means 53, 54 opposing the removal-side holding means 50, 51. The holding means 53 is likewise formed as a groove, whereas the holding means 54 is in the form of two opposing, in particular elastomer-coated, rolls 57, 58 and thus functions at the same time as a clamping arrangement in which the endless roving or the end thereof can be clamped.

Figure 9A:
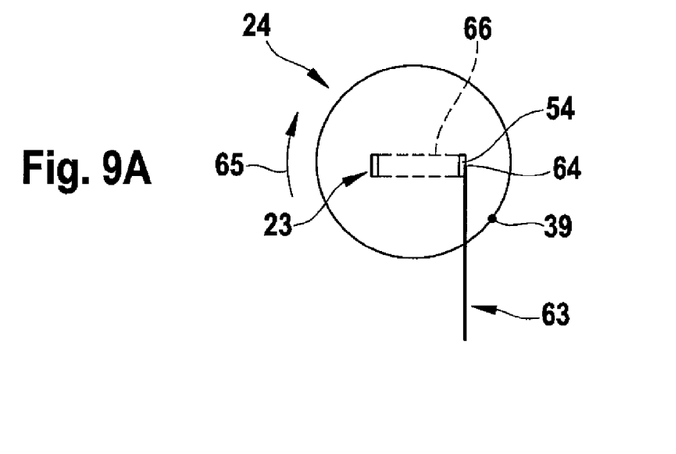
FIG. 9A to FIG. 9F show method states during operation of the device illustrated in FIG. 5.
Figure 9B:
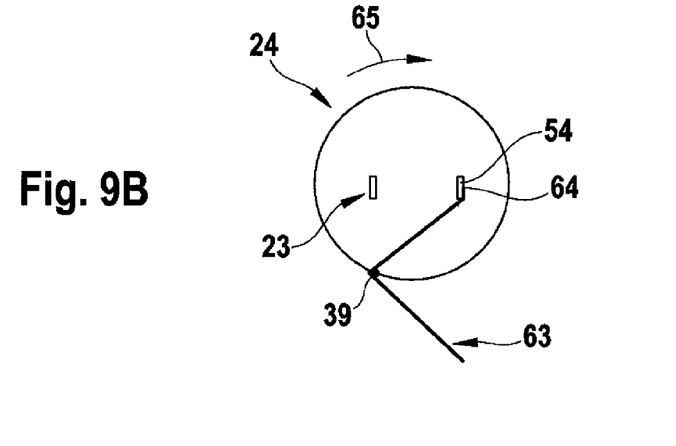
Figure 9C:
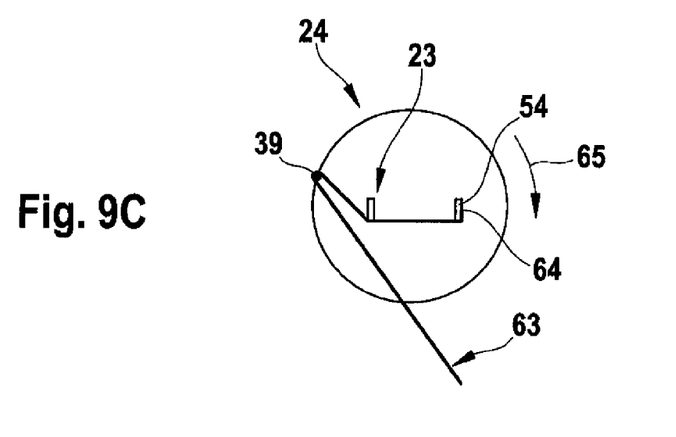
Figure 9D:
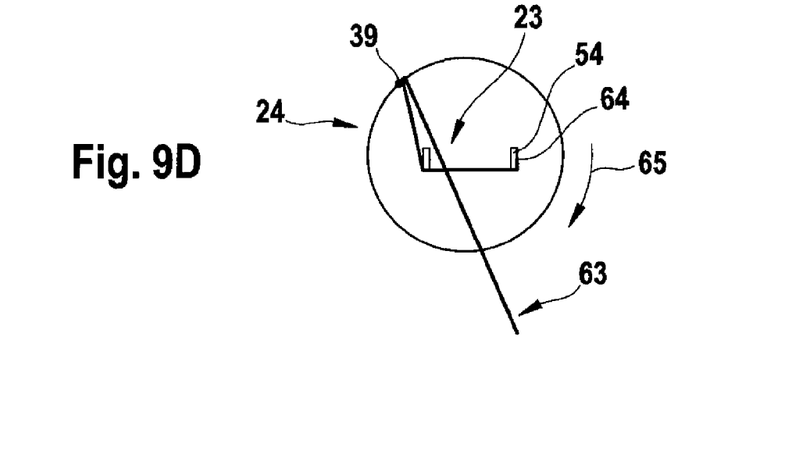
Figure 9E:
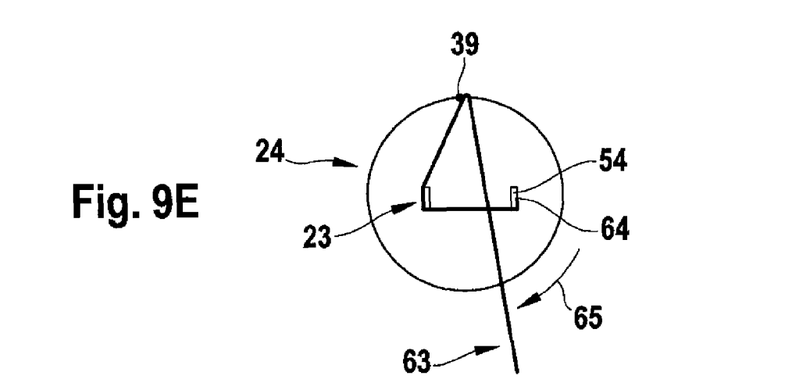

For an endless roving wound around the setting arrangement 23, the holding means 50 . . . 54 define a frame (see reference numeral 66 in FIG. 9A). A cutting arrangement 60, which is in the form of a knife, is arranged between the holding means 53 and the clamping arrangement 54 on a line of symmetry 55 of the imaginary frame, which line forms an intersection point with the needle 15. The cutting arrangement 60 cuts through the roving which extends from the supply-side holding means 53 into the clamping arrangement 54.

A spindle drive 61, which can be used to vary a distance 62 between the removal-side holding means 50, 51 and the supply-side holding means 53 or the holding means/clamping arrangement 54, is shown merely schematically.

FIG. 9 to 15 illustrate the method according to the invention in greater detail.

Figure 10:
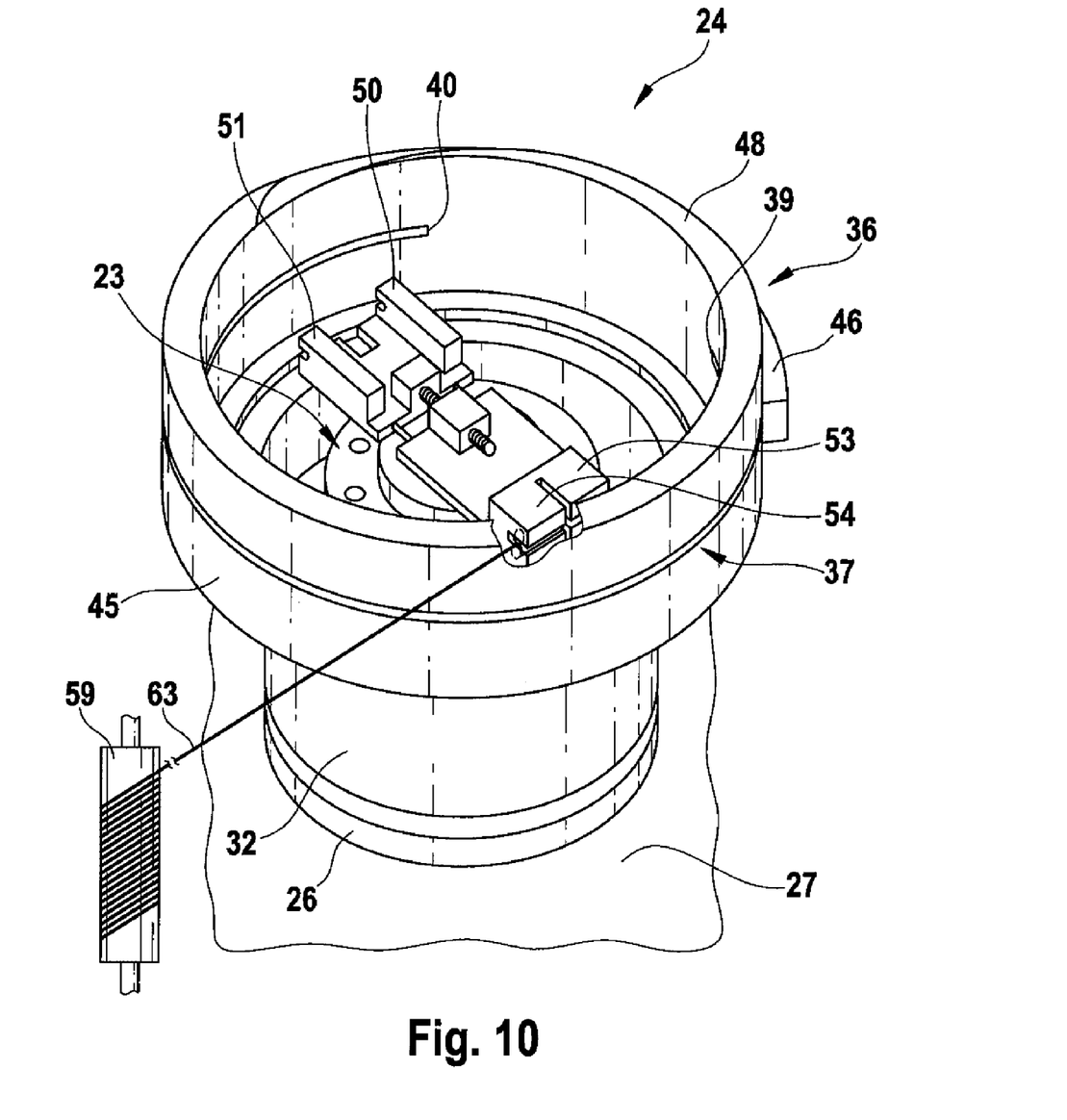
FIG. 10 is a perspective view of the method state illustrated in FIG. 9A.

At the beginning of the method, an end 64 of the endless roving 63, said end being guided through the slot 37 from outside the bracing arrangement 24, for example from a spindle 59, is clamped into the clamping arrangement 54, i.e. between the rolls 57, 58, of the device 11, as may be seen in particular from FIG. 9A or FIG. 10.

In a further method step the bracing arrangement 24 rotates, in the case of the present exemplary embodiment, in the clockwise direction, indicated by reference numeral 65.

Rotation of the bracing arrangement 24 brings the start 39 of the slot 37 into engagement with the endless roving 63, as a result of which the endless roving is braced, on further rotation of the bracing arrangement 24, around the setting arrangement 23, as may be seen from FIG. 9B to 9E and FIG. 11 to 14. An arrangement (not shown in greater detail), which is preferably arranged between the device 11 and the spindle 59, ensures that the endless roving 63 is tensioned at all times.

Figure 11:
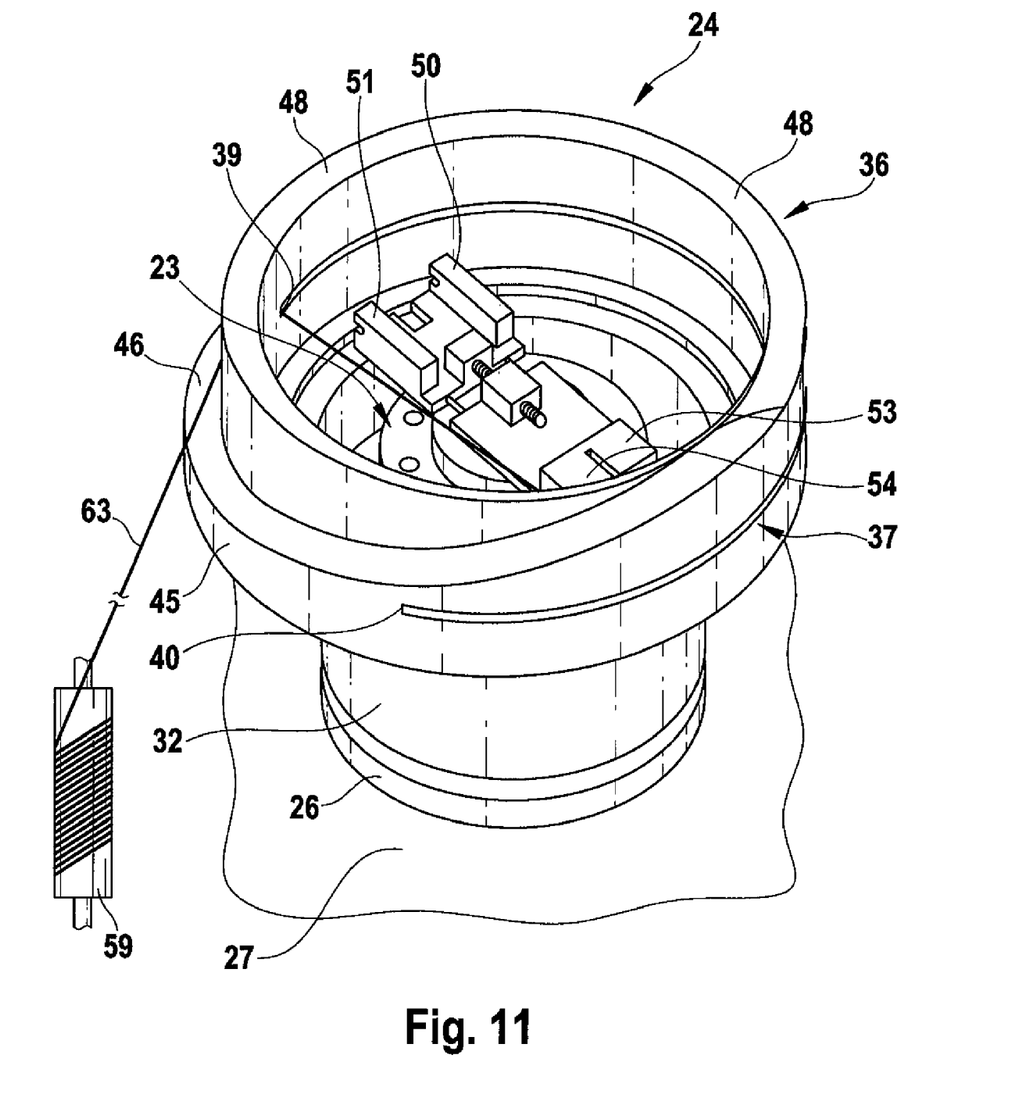
FIG. 11 is a perspective view of the method state illustrated in FIG. 9B.
Figure 12:
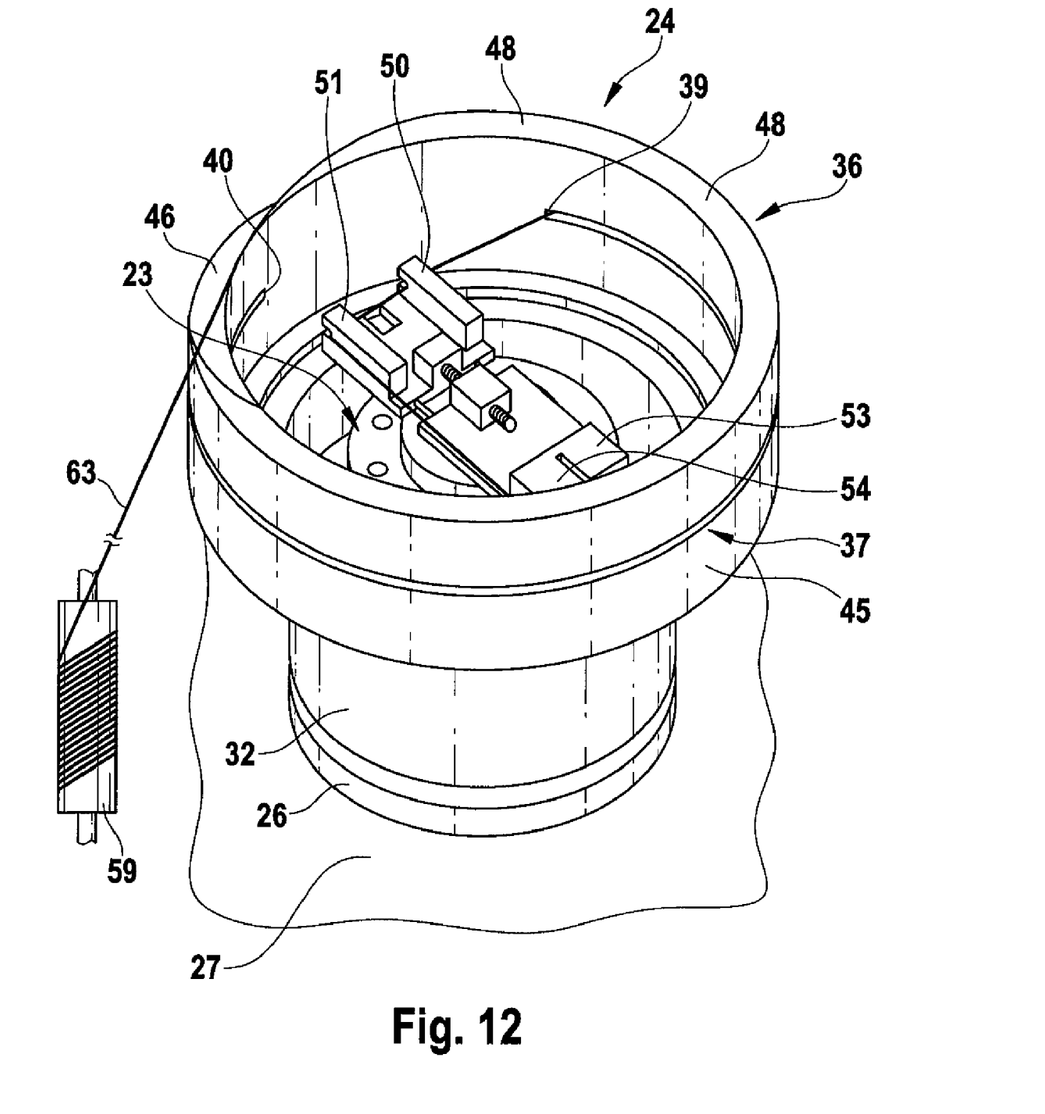
FIG. 12 is a perspective view of the method state illustrated in FIG. 9C.
Figure 13:
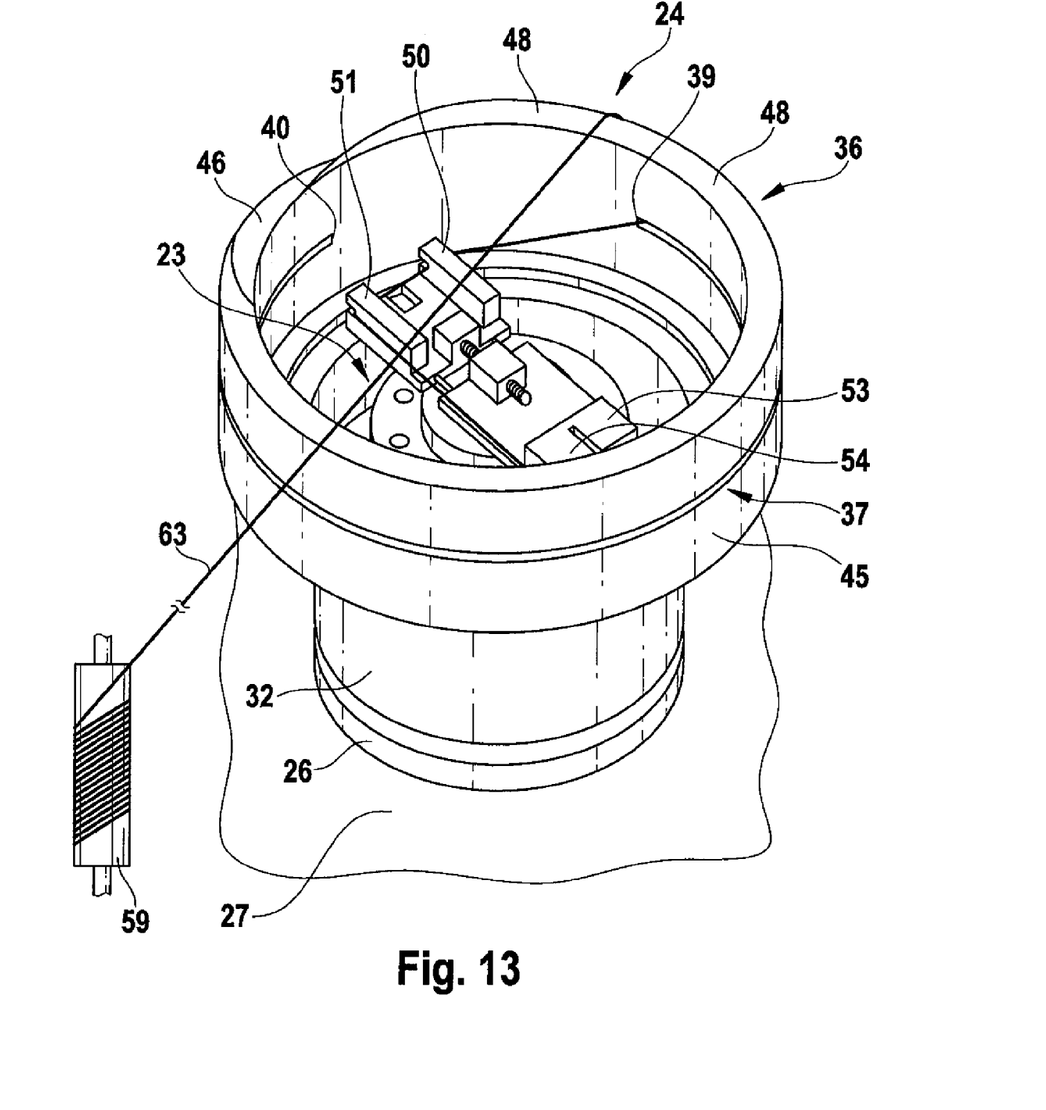
FIG. 13 is a perspective view of the method state illustrated in FIG. 9E.
Figure 14:
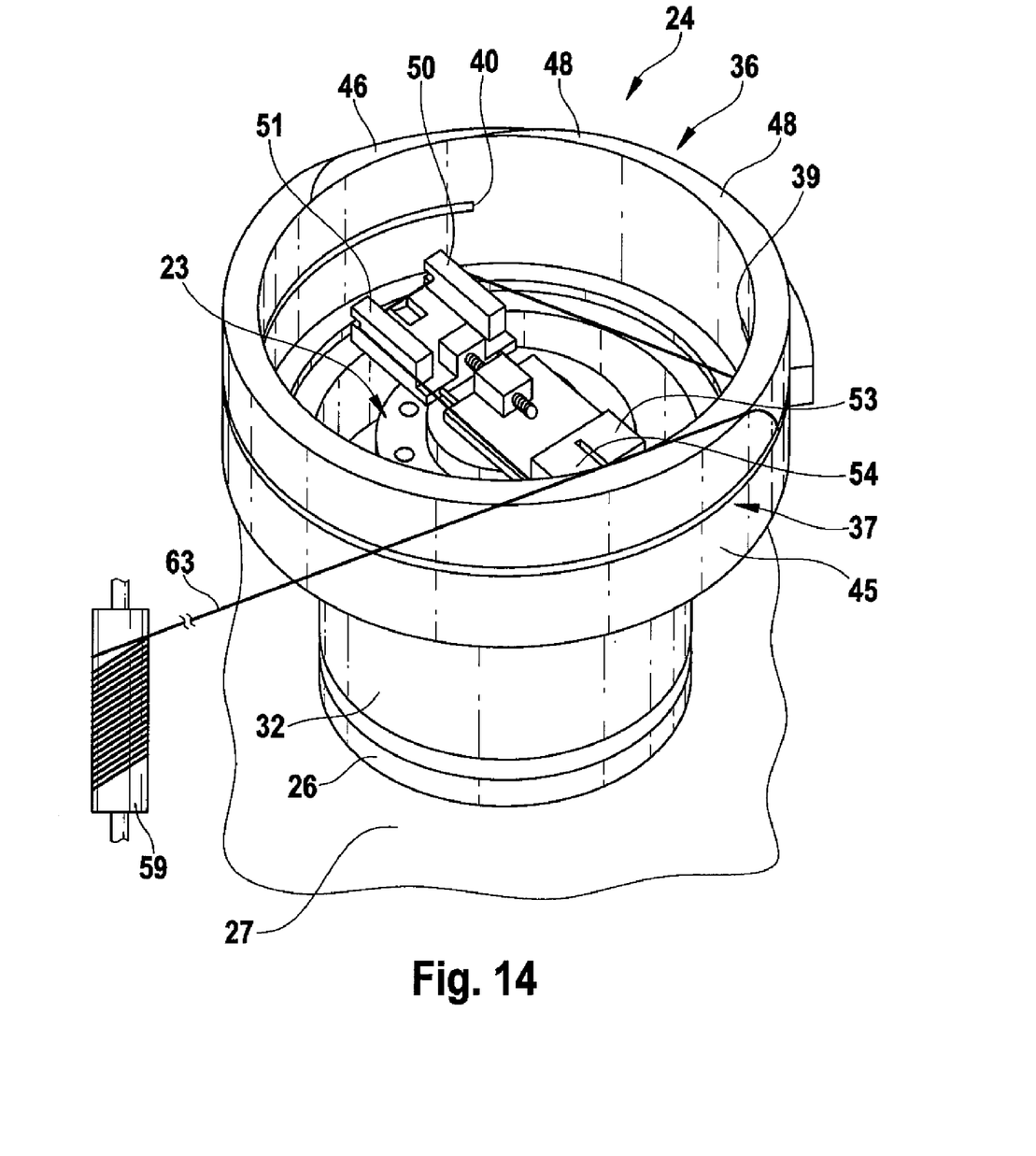
FIG. 14 is a perspective view of a method state shortly before the method state shown in FIG. 9F.
Figure 15:
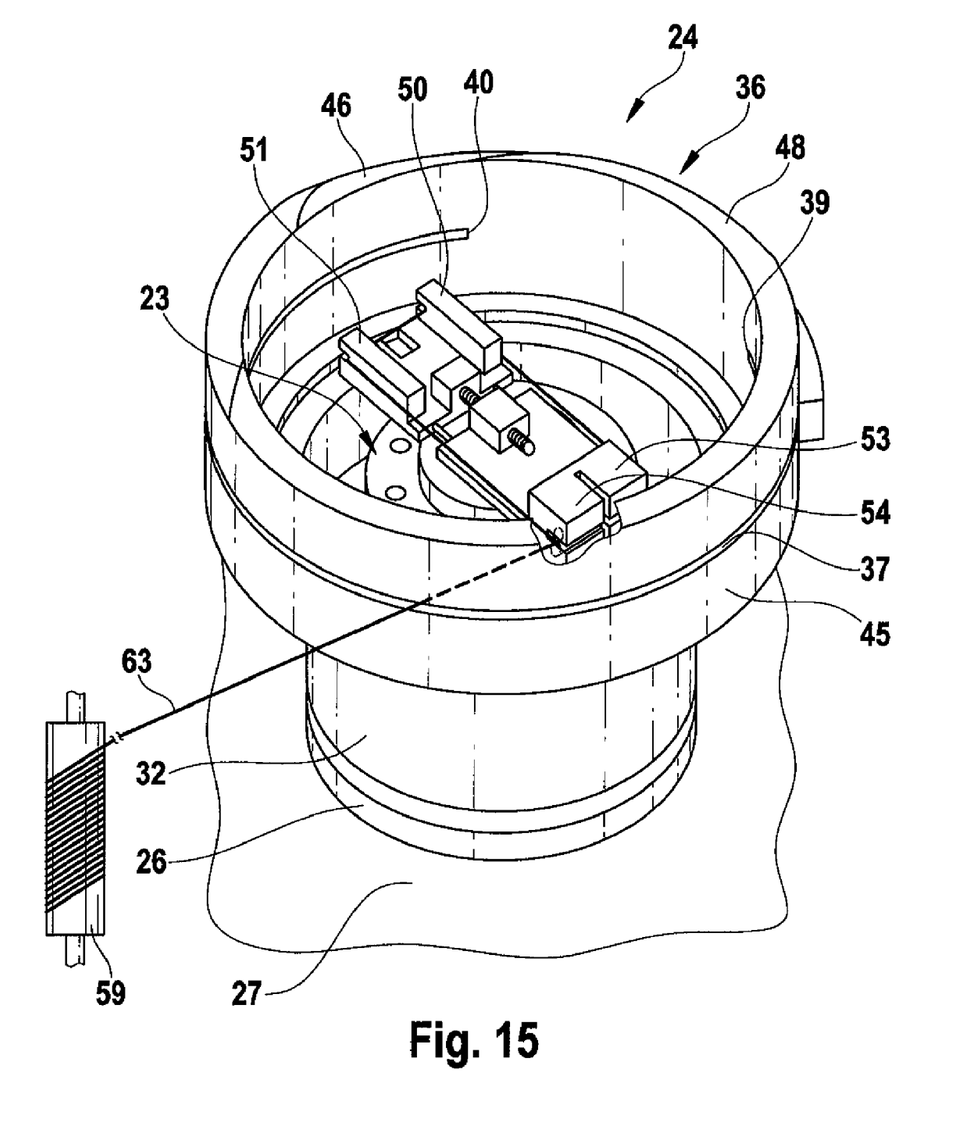
FIG. 15 is a perspective view of the method state shown in FIG. 9F.

As may be seen in particular from FIGS. 11 and 12, the ramp 46 grasps the endless roving 63 from below and lifts it gradually onto the end face 48 of the ring 36. As the ring 36 continues to rotate, the endless roving 63 slips, owing to the tension therein, across the end face 48 and falls down along the outer wall 45 of the ring 36. The slot 37 enables the endless roving 63 to then be placed instantaneously around the removal-side holding means 53, 54. As shown in FIG. 9A to 9F, the endless roving 63 is thus tensioned around a substantially rectangular frame 66 (imaginary line).

Figure 9F:
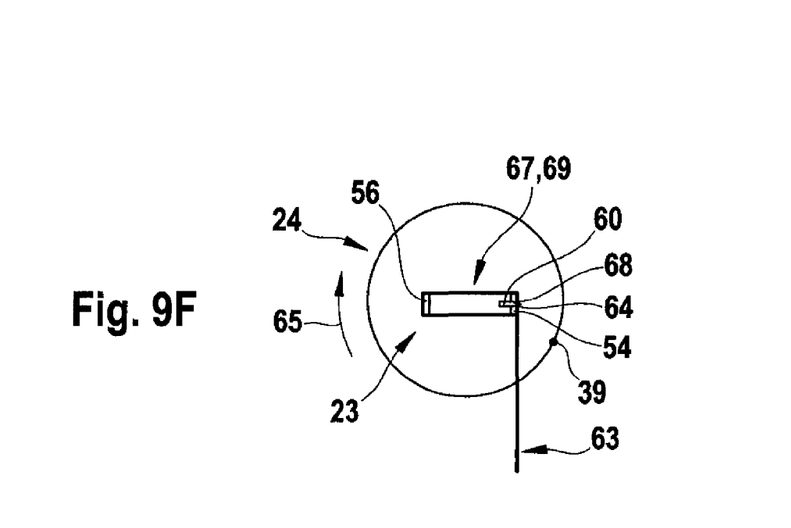

The loop 67 which is formed may clearly be seen in FIG. 9F. In order now to provide the cut-to-length roving, this loop 67 has to be separated off from the endless roving 63.

However, this is only possible once an end 68, which is associated with the new loop to be formed, is clamped in the clamping arrangement 54. For this purpose, the end 68 is drawn at the front 58a between the rolls 57, 58, the end 64 being released at the back 58b. At the same time, the loop 67 is cut off by means of the cutting arrangement 60 in front of the newly clamped end 68 of the loop to be newly formed and then forms a cut-to-length roving 69 (corresponds to the loop 67 after the cutting process) having a defined length of precisely one times the circumference of the frame 66.

Subsequently, the cut-to-length roving 69 is removed from the device 11 by means of the eye 16 of the needle 15 and drawn into the through-hole 17 (see FIG. 5).

On account of the symmetrical formation of the frame 66 and the opposing arrangement of the removal region 56, in which the needle 15 picks up the cut-to-length roving 69, and the cutting arrangement 60, the cut-to-length roving 69 can be gripped at all times centrally by means of the needle 15: in particular even when a distance 62 between the holding means 50, 51 and 53, 54 respectively is adjusted by means of the spindle drive 61.

It goes without saying that the machine 10 can have a plurality of the devices 11 and associated hook needles 15.

The drive, which causes the bracing arrangement 24 to rotate about the stationary setting arrangement 23, has not been shown for the sake of clarity.

Although the invention has been described in the present document in relation to a preferred exemplary embodiment, it is not limited thereto, but can be modified in many different ways.

The present invention relates to a device and a method for providing cut-to-length rovings having a defined length from an endless roving, in particular in the aviation and aerospace sector, and also to a machine with a device of this type. The device has a loop shape setting arrangement, a loop bracing arrangement and a cutting arrangement. An endless roving can be braced by means of the loop bracing arrangement onto the loop shape setting arrangement, thus forming a loop which can be cut to length by means of the cutting arrangement in order to produce the cut-to-length roving. The device or the method allows the simple provision of a cut-to-length roving which can subsequently be picked up by a needle and drawn into a through-hole in a semi-finished textile product perpendicularly to the fibre layers therein.

The invention claimed is:

1. A device for providing cut-to-length rovings having a defined length from an endless roving, comprising:
   a loop shape setting arrangement which sets a shape of a loop to be formed;
   a loop bracing arrangement which can rotate about the loop shape setting arrangement and by means of which the endless roving can be braced onto the loop shape setting arrangement to form the loop; and
   a cutting arrangement by means of which the loop which is formed can be cut to length from the endless roving in order to produce the cut-to-length roving.

2. The device according to claim 1, wherein the loop shape setting arrangement comprises a removal-side holding means and a supply-side holding means spaced apart therefrom, which holding means together form a frame onto which the endless roving can be braced to form the loop.

3. The device according to claim 2, wherein the removal-side and the supply-side holding means are formed as grooves.

4. The device according to claim 2, wherein the loop shape setting arrangement comprises a removal region for taking up the cut-to-length roving by means of a needle.

5. The device according to claim 4, wherein the removal region is formed as two grooves for guiding the loop via a recess arranged between the two grooves.

6. The device according to claim 4, wherein the cutting arrangement is arranged opposite the removal region based on a centre point of an axis of symmetry of the frame.

7. The device according to claim 2, wherein the distance between the removal-side and the supply-side holding means is adjustable.

8. The device according to claim 7, wherein the removal-side holding means with the removal region is provided so as to be stationary and the supply-side holding means with the cutting arrangement is provided so as to be linearly adjustable with respect to the removal-side holding means and the removal region.

9. The device according to claim 1, wherein the loop shape setting arrangement comprises a clamping arrangement for clamping an end of the endless roving.

10. The device according to claim 1, wherein the loop bracing arrangement comprises a ring which is provided so as to be rotatable about the loop shape setting arrangement, wherein the endless roving can be fed to the loop shape setting arrangement through an opening in the wall of the ring.

11. The device according to claim 10, wherein the opening is formed as a slot extending in certain portions in the circumferential direction of the ring.

12. The device according to claim 10, wherein a ramp is formed on the outside of the ring and begins, viewed in the longitudinal direction of the ring, upstream of the opening and ends, at an end face of the ring, downstream of the opening.

13. The device according to claim 1, wherein the loop shape setting arrangement is provided so as to be rotationally fixed and the loop bracing arrangement is provided so as to be able to be driven in rotation.

14. The device according to claim 10, wherein the device comprises a shaft, on one end of which the loop shape setting arrangement is mounted and at the other end of which a means is provided for securing the shaft to a machine associated with the device, a bearing portion of the loop bracing arrangement being provided so as to be supported on the shaft, said bearing portion adjoining the ring in the longitudinal direction.

15. A method for providing cut-to-length rovings having a defined length from an endless roving, comprising the following steps:
   setting a shape of a loop to be formed by means of a loop shape setting arrangement;
   bracing the endless roving onto the loop shape setting arrangement by means of a loop bracing arrangement which can rotate about the loop shape setting arrangement; and cutting to length the loop which is formed from the endless roving in order to produce the cut-to-length roving by means of a cutting arrangement.

16. A machine for reinforcing a semi-finished textile product, comprising:
   a device according to claim 1;
   a needle which comprises a tip which is provided with an eye for taking up the cut-to-length roving and
   a take-up region into which the semi-finished textile product can be inserted in a planar manner between the needle and the device;
   wherein, in a first operation of the machine, the needle penetrates the semi-finished textile product and forms a through-hole therein, in a second operation of the machine, the eye centrally takes up the cut-to-length roving from the removal region of the loop shape setting arrangement and, in a third operation, draws the doubled-up roving into the through-hole.

17. The device of claim 7, wherein the distance between the removal-side and the supply-side holding means is adjustable by means of a spindle drive.

18. The device of claim 9, wherein the clamping arrangement comprises a notch or rolls for clamping the end of the endless roving.

19. The device of claim 14, wherein the means for securing the shaft comprises a flange.

* * * * *